United States Patent [19]

Saatze

[11] 4,412,721
[45] Nov. 1, 1983

[54] TRANSITION PIECE FOR THE CONVERSION OF A CIRCULAR CONDUCTOR ARRANGEMENT OF A CABLE OR SUCH INTO A LINEAR CONDUCTOR ARRANGEMENT AND CONVERSELY

[75] Inventor: Kuno Saatze, Emmering, Fed. Rep. of Germany

[73] Assignee: Siemens Aktiengesellschaft, Berlin & Munich, Fed. Rep. of Germany

[21] Appl. No.: 263,415

[22] Filed: May 14, 1981

[30] Foreign Application Priority Data

Jul. 14, 1980 [DE] Fed. Rep. of Germany ....... 3026631

[51] Int. Cl.³ ............................................... G02B 7/26
[52] U.S. Cl. ................................. 350/96.20; 350/96.22
[58] Field of Search .......................... 81/9.51; 226/196; 339/102 R, 103 M, 275 T; 350/96.20, 96.22, 96.23

[56] References Cited

U.S. PATENT DOCUMENTS 2,701,867  2/1955  Obenschain et al. ............ 339/102 R
4,352,550  10/1982  Uchida ............................ 350/96.20

FOREIGN PATENT DOCUMENTS 1622475  4/1970  Fed. Rep. of Germany ... 350/96.20
1438349  4/1966  France ............................ 350/96.20
1218107  6/1971  United Kingdom .

OTHER PUBLICATIONS

Schmid, *Electronics*, vol. 49, No. 18, Sep. 2, 1976, pp. 94-99, "Fiber-Optic Data Transmission: A Practical, Low-Cost Technology".

*Primary Examiner*—John D. Lee
*Assistant Examiner*—Frank González
*Attorney, Agent, or Firm*—Hill, Van Santen, Steadman & Simpson

[57] ABSTRACT

A method and apparatus is disclosed for conversion of a circular conductor arrangement of a multiconductor cable or such into a linear conductor arrangement or vice-versa. A formed part is employed with spatially running channels for the individual conductors of the cable. At one face of the formed part, channel inlets for the conductors are arranged in a circular fashion or vice-versa corresponding to a structure of the cable or other termination, and at another face the cable outlets are arranged corresponding to a desired linear conductor arrangement or vice-versa.

5 Claims, 13 Drawing Figures

TRANSITION PIECE FOR THE CONVERSION OF A CIRCULAR CONDUCTOR ARRANGEMENT OF A CABLE OR SUCH INTO A LINEAR CONDUCTOR ARRANGEMENT AND CONVERSELY

BACKGROUND OF THE INVENTION

The invention concerns a transition piece for the conversion of a circular conductor arrangement of a multiconductor cable or such into a linear conductor arrangement and vice-versa. Such conversion of light wave guide cables is particularly relevant.

During the connection of multiconductor cables, in particular, in the case of light wave guide cables, circular conductor arrangements generally must be converted into linear arrangements since the required work processes for the connection and contacting of the individual light wave guides are usually carried out in a linear arrangement. Previously, the problem was solved in that the removed and divided basic bundle is inserted into a correspondingly shaped plate or sheet-like member wherein the individual conductors are inserted in grooves of a plate or sheet member and are clamped by screws with the help of a further plate or sheet member. A transition piece comprised of several plate or sheet members is relatively complicated and expensive to produce, and in the assembly of the light wave guides requires increased alertness so that the correct counting direction and sequence of the individual conductors in the circular and linear arrangements coincide. A transposition of individual conductors necessarily leads to faulty connections.

SUMMARY OF THE INVENTION

It is an object of the invention to create a simple and inexpensive transition piece which is simple to manipulate, and wherein the danger of a transposition of individual conductors is practically impossible. The transition piece according to the invention is characterized by providing a formed part with spatially running channels for use with the individual conductors. On the one face of the formed part, the channel inlets for the conductors are arranged in circular fashion corresponding to the cable structure, and at the other face of the formed part, the cable outlets are arranged to correspond to the desired linear conductor arrangement. The individual conductors then need only be inserted into the channels; thus they can be very simply mounted. By means of the spatially running channels, a transposition of individual conductors is practically impossible.

Preferably, the channels for the individual conductors are arranged in the formed part parallel to one another at the channel inlets and at the channel outlets. In this manner, impermissible bending stresses of the conductors arising at the future place of use can be prevented. This is of significant importance in particular in the case of very sensitive light wave guides.

Preferably, the formed part is a cylindrical body at the opposite faces of which the cable inlets and outlets are provided. This shape is particularly simple and practical. If needed, however, the external shape of the formed part can be easily accommodated to the given situations in each case.

The transition piece is manufactured according to the invention in a simple manner by means of casting or direct injection molding or extrusion. As a casting material, materials can be used which are known per se, and which are workable either cold or warm, for example even thermoplastics.

An especially simple manufacturing method results in that a hollow cylindrical casting mold is used which is closed on both faces by means of disk-shaped parts in which perforations corresponding to the conductor arrangements are provided for the cores for molding of the channels.

According to a further development of the invention, rods or tubes are used with tapering cross sections in order to maintain larger inlet and smaller outlet openings of the channels.

DESCRIPTION OF THE PREFERRED EMBODIMENTS

Figure 1:
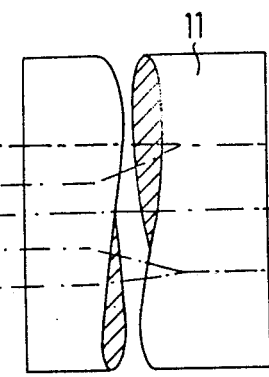
FIG. 1 shows in side view a cylindrical formed part of the invention.

In FIG. 1, a cylindrical formed part is shown whereby the midpoints of the channels designated 1-8 are indicated with dot and dash lines. A face 12 of the cylindrical formed part 11 has a circular arrangement of the inlets of the channels 1-8, while a face 13 has a linear arrangement of the outlets of the channels 1-8. The outlets of the channels 1-8 are arranged displaced with respect to one another in two rows. A central bore hole 14 serves, where required, for a central traction relief element.

Figure 2:
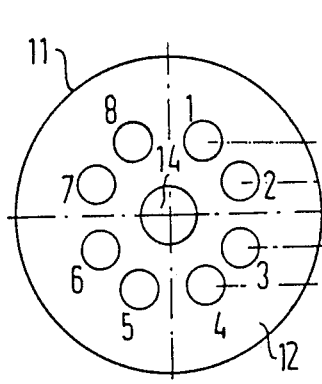
FIG. 2 shows a front view from the left onto the cylindrical formed part according to FIG. 1 with channel inlets.
Figure 3:
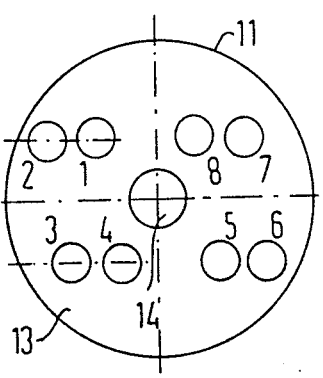
FIG. 3 shows a front view from the right onto the cylindrical formed part according to FIG. 1 with channel outlets.
Figure 4:
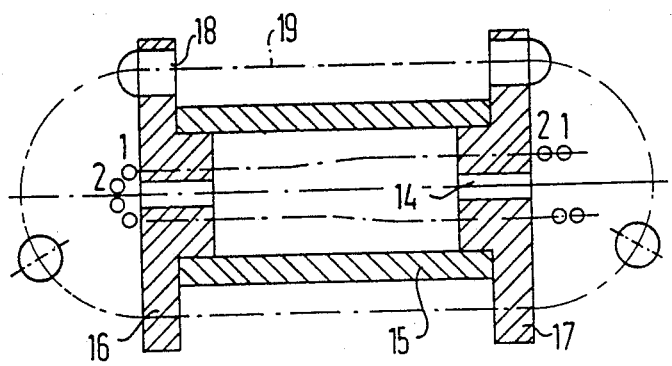
FIG. 4 shows a casting mold for casting of the cylindrical formed part depicted in FIGS. 1 through 3.

FIG. 4 shows a casting mold for the production of the formed part depicted in FIGS. 1-3. With 15, a hollow cylindrical casting mold is designated, the inner diameter of which corresponds to the outer diameter of the cylindrical formed part. The hollow cylindrical casting mold is closed at both faces with disk-shaped parts 16 and 17. The flanges of the disk-shaped parts 16 and 17 are provided with bore holes 18 for drawing bolts to hold together the casting mold, as is indicated with dot and dash lines 19. The disk-shaped parts 16 and 17 have bore holes arranged corresponding to the faces 12 and 13 according to FIGS. 2 and 3, through which, for example, a perlon wire or spring steel wire can be drawn. These then form the cores for molding of the individual channels. The exterior of these wires is in a practical manner provided with a parting or separating compound in order to be able to pull them out after the filling of the casting mold with the casting compound so that the channels 1-8 according to FIGS. 1-3 arise. In place of wires, corresponding tubes of plastic also can be used which, however, then can remain in the casting mold. In the channels formed in this manner, then, the individual conductors of the cable are inserted, and specifically in the correct sequence corresponding to the numbering 1-8.

Also as shown in FIG. 4, the wire-shaped cores are guided only in the disk-shaped parts 16 and 17. However, they extend in a free-running manner over the hollow cylindrical casting mold 15. In FIG. 4, for the sake of overview, the sprue for the mold is not shown.

Figure 6:
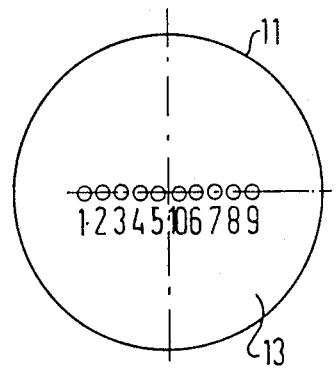
FIG. 6 shows a front view from the left onto the cylindrical formed part according to FIG. 5 with channel inlets.
Figure 5:
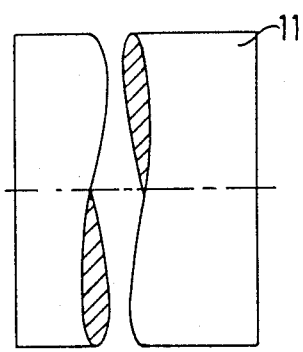
FIG. 5 shows another cylindrical formed part.
Figure 7:
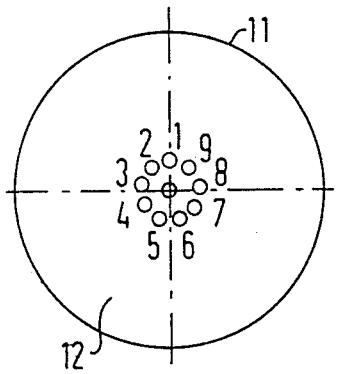
FIG. 7 shows a front view onto the cylindrical formed part according to FIG. 5 with channel outlets.
Figure 8:
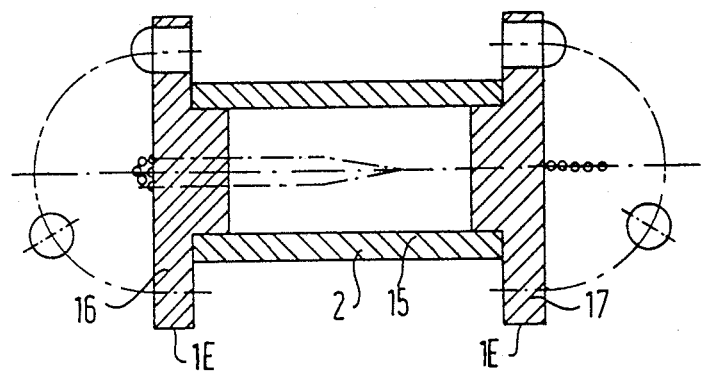
FIG. 8 shows a casting mold for casting of the cylindrical formed part depicted in FIGS. 5-7.

FIG. 5 shows a cylindrical formed part 11 with another arrangement of the channel inlets or outlets. FIGS. 6 and 7 shows the arrangement of the inlets and outlets of the channels 1-10. As shown in particular in FIG. 7, a channel 10 is also provided in the center of the cylindrical formed part 11. FIG. 8 shows the corresponding casting mold for the production of the cylindrical formed part 11 according to FIGS. 5-11, whereby the same parts are provided with the same reference numbers as before.

Figure 10:
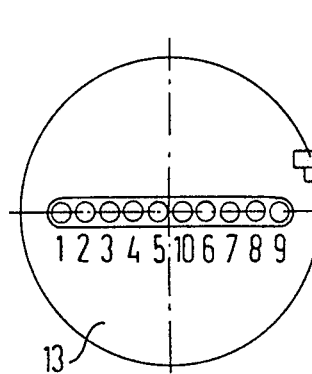
FIG. 10 shows a front view from the right onto the cylindrical formed part according to FIG. 9.
Figure 9:
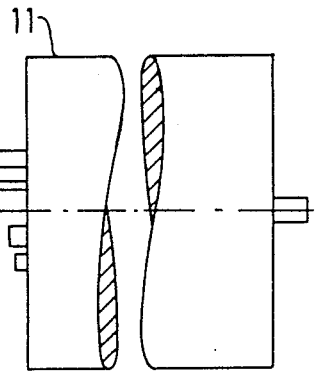
FIG. 9 shows a cylindrical formed part with inserted tubes.
Figure 11:
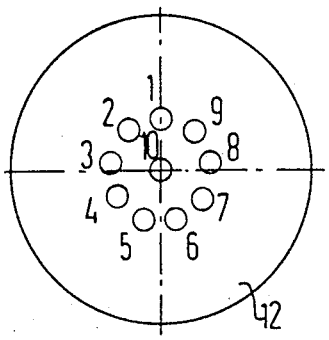
FIG. 11 shows a front view from the left onto the cylindrical formed part according to FIG. 9.
Figure 12:
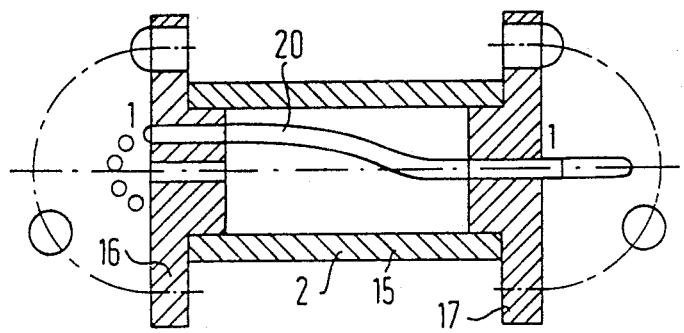
FIG. 12 shows a casting mold for the manufacture of the cylindrical formed part according to FIGS. 9-11.

In FIGS. 9-11, a cylindrical formed part 11 is depicted whereby the path of the channels 1-10 is similar as in the case of the embodiment example according to FIGS. 5-7. However, here the bore holes for the channels 1-10 are provided with tubes. FIG. 12 shows the corresponding casting mold whereby in the corresponding bore holes of the disk-shaped parts 16 and 17, insulating tubes 20 are introduced for the production of the channels. These insulating tubes remain in the formed part after filling of the casting mold 15.

Figure 13:
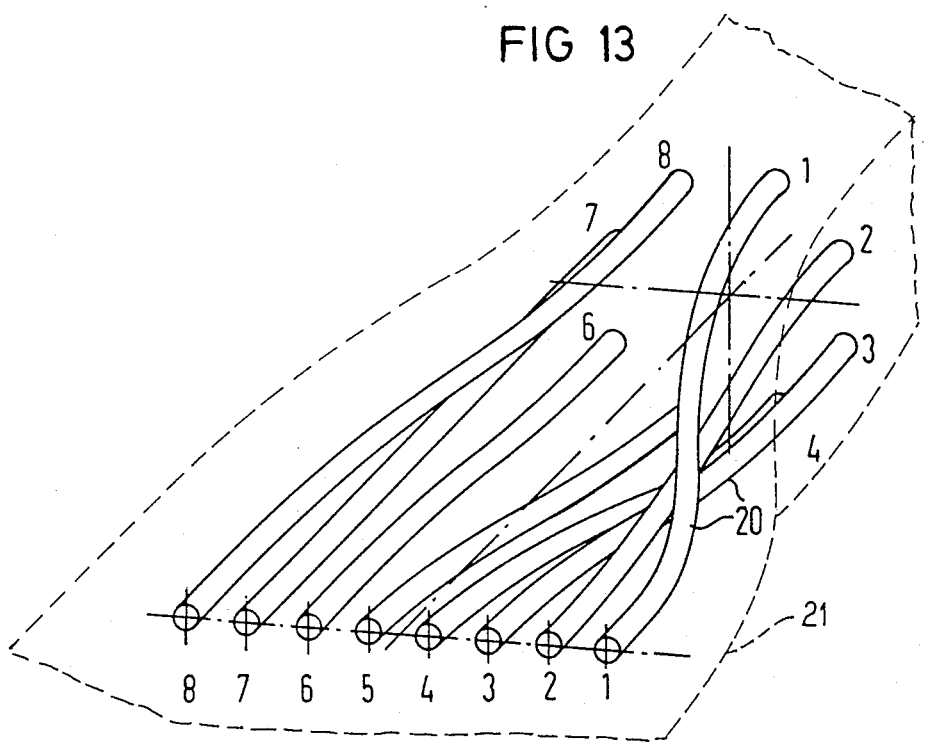
FIG. 13 shows a linear-circular transition with the help of tubes which run parallel.

FIG. 13 shows a spatial depiction of the path of the channels 1-8 during transition from a circular conductor arrangement into a linear conductor arrangement. If, for example, in the case of the embodiment example according to FIG. 13, tubes 20 are used for the channels wherein the tubes are connected with one another via a film 21, then the transition piece can be designed such that the tubes 1-8 which lie in a plane at the back end can be twisted together into a round arrangement as, for example, FIG. 13 shows.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A guide-channel transition piece for conversion of a circular conductor arrangement of a multiconductor cable or such into a linear conductor arrangement and vice-versa, comprising: a formed part with spatially running hollow guide channel means continuously extending between two faces of the transition piece for freely receiving the individual conductors of the cable inserted into the channel means; on one face of the formed part channel inlets for the conductors are arranged in circular fashion corresponding to a structure of the cable, and at the other face channel outlets are arranged corresponding to a desired linear conductor arrangement.

2. A transition piece according to claim 1 wherein channels for the individual conductors are arranged parallel to one another at the channel inlets and at the channel outlets in the formed part.

3. A transition piece according to claim 1 wherein the formed part is a cylindrical body on the opposite faces of which the cable inlets and outlets are provided.

4. A transition piece for conversion of a circular conductor arrangement of a multiconductor cable or such into a linear conductor arrangement and vice-versa, comprising: a formed part with spatially running channels for the individual conductors of the cable; on one face of the formed part channel inlets for the conductors are arranged in circular fashion corresponding to a structure of the cable, and at another face channel outlets are arranged corresponding to a desired linear conductor arrangement; and the running channels within the formed part being constructed of tubes embedded in the formed part.

5. A transition piece for conversion of a circular conductor arrangement of a multiconductor cable or such into a linear conductor arrangement and vice-versa, comprising: a formed part with spatially running channels for the individual conductors of the cable; on one face of the formed part, the channel openings for the conductors are arranged in circular fashion and at another face of the formed part the channel openings are arranged corresponding to a desired linear conductor arrangement; and the formed part comprising a plurality of tubes forming said running channels, and with a film connecting adjacent channels to one another in substantially parallel fashion, said film being twisted to provide the transition from the circular to the linear arrangement.

* * * * *